(12) United States Patent
Everaerts et al.

(10) Patent No.: US 7,494,708 B2
(45) Date of Patent: *Feb. 24, 2009

(54) (METH)ACRYLATE BLOCK COPOLYMER PRESSURE SENSITIVE ADHESIVES

(75) Inventors: Albert I. Everaerts, Oakdale, MN (US); Ying-Yuh Lu, Woodbury, MN (US); Lang N. Nguyen, St. Paul, MN (US); Jianhui Xia, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/872,979

(22) Filed: Oct. 16, 2007

(65) Prior Publication Data

US 2008/0138557 A1 Jun. 12, 2008

Related U.S. Application Data

(60) Continuation of application No. 11/775,420, filed on Jul. 10, 2007, which is a division of application No. 10/901,629, filed on Jul. 29, 2004, now Pat. No. 7,255,920.

(51) Int. Cl.
   *B32B 7/12* (2006.01)
   *B32B 27/36* (2006.01)
   *B32B 27/30* (2006.01)

(52) U.S. Cl. ............... 428/355 AC; 428/412; 428/520; 428/522

(58) Field of Classification Search ......... 525/244, 525/249; 524/558; 528/500, 522
   See application file for complete search history.

(56) References Cited

U.S. PATENT DOCUMENTS

| 4,248,748 A | 2/1981 | McGrath et al. |
| 4,336,345 A | 6/1982 | Lewis et al. |
| 4,977,003 A | 12/1990 | Brown et al. |
| 5,233,465 A | 8/1993 | Wheatley et al. |
| RE34,605 E | 5/1994 | Schrenk et al. |
| 5,360,659 A | 11/1994 | Arends et al. |
| 5,579,162 A | 11/1996 | Bjornard et al. |
| 5,648,425 A | 7/1997 | Everaerts et al. |
| 5,858,624 A | 1/1999 | Chou et al. |
| 5,882,774 A | 3/1999 | Jonza et al. |
| 5,897,727 A | 4/1999 | Staral et al. |

(Continued)

FOREIGN PATENT DOCUMENTS

EP           0349232           5/1993

(Continued)

OTHER PUBLICATIONS

"Standard Test Method for Haze and Luminous Transmittance of Transparent Plastics", ASTM Standards, pp. 220-223, 1995.

*Primary Examiner*—Kevin R. Kruer
(74) *Attorney, Agent, or Firm*—Jean A. Lown

(57) ABSTRACT

Articles are provided that include an optical film and an optically clear pressure sensitive adhesive layer on at least one outer surface of the optical film. Additionally, articles are provided that include a pressure sensitive adhesive layer that resists bubble formation when adhered to an outgassing substrate. The pressure sensitive adhesive layer in the various articles contain a (meth)acrylate block copolymer.

21 Claims, 1 Drawing Sheet

U.S. PATENT DOCUMENTS

| | | |
|---|---|---|
| 5,905,099 A | 5/1999 | Everaerts et al. |
| 6,004,670 A | 12/1999 | Kobe et al. |
| 6,012,818 A | 1/2000 | Araki |
| 6,049,419 A | 4/2000 | Wheatley et al. |
| 6,071,621 A | 6/2000 | Falaas et al. |
| 6,083,335 A | 7/2000 | Scullin et al. |
| 6,180,200 B1 | 1/2001 | Ha et al. |
| 6,277,485 B1 | 8/2001 | Invie et al. |
| 6,352,769 B1 | 3/2002 | Mori |
| 6,413,630 B1 | 7/2002 | Nakayama |
| 6,703,441 B2 | 3/2004 | Husemann et al. |
| 6,723,407 B2 | 4/2004 | Dollase et al. |
| 6,734,256 B1 | 5/2004 | Everaerts et al. |
| 6,806,320 B2 | 10/2004 | Everaerts et al. |
| 6,887,917 B2 | 5/2005 | Yang et al. |
| 6,894,114 B2 | 5/2005 | Kato et al. |
| 6,939,911 B2 | 9/2005 | Tosaki et al. |
| 6,942,911 B2 | 9/2005 | Nakayama |
| 6,949,297 B2 | 9/2005 | Yang et al. |
| 7,084,209 B2 | 8/2006 | Everaerts et al. |
| 7,141,294 B2 | 11/2006 | Sakurai et al. |
| 7,255,920 B2 * | 8/2007 | Everaerts et al. ...... 428/355 AC |
| 2002/0098361 A1 | 7/2002 | Bennett et al. |
| 2003/0119970 A1 | 6/2003 | Husemann et al. |
| 2003/0211337 A1 | 11/2003 | Muraoka |
| 2004/0122161 A1 | 6/2004 | Paul et al. |
| 2004/0202879 A1 | 10/2004 | Xia et al. |

FOREIGN PATENT DOCUMENTS

| | | |
|---|---|---|
| EP | 0349270 | 8/1994 |
| EP | 0921170 | 6/1999 |
| EP | 1094086 | 4/2001 |
| EP | 1234864 | 8/2002 |
| EP | 1132410 | 11/2003 |
| JP | 11302617 | 11/1999 |
| JP | 11323072 | 11/1999 |
| WO | WO 97/18247 | 5/1997 |
| WO | WO 98/01478 | 1/1998 |
| WO | WO 00/39233 | 7/2000 |
| WO | WO 03/037648 | 5/2003 |
| WO | WO 03/040250 | 5/2003 |

* cited by examiner

US 7,494,708 B2

(METH)ACRYLATE BLOCK COPOLYMER PRESSURE SENSITIVE ADHESIVES

RELATED APPLICATIONS

This application is continuation application of U.S. Ser. No. 11/775,420, filed Jul. 10, 2007, which is a divisional application of U.S. Ser. No. 10/901,629, filed Jul. 29, 2004, now U.S. Pat. No. 7,255,920.

TECHNICAL FIELD

This invention relates to articles that include a pressure sensitive adhesive that contains a (meth)acrylate block copolymer.

BACKGROUND

Pressure sensitive adhesives have significant commercial applications. While a variety of pressure sensitive adhesive compositions are known, not all such compositions are suitable for use in optical applications where optical clarity is desired. In such applications, it is often desirable that the pressure sensitive adhesive remains optically clear during the manufacture and lifetime of the optical component or product.

The stability, clarity, bond strength, or a combination thereof of some known pressure sensitive adhesives can be adversely affected when used in combination with some optical films or other substrates. For example, substrates that contain polycarbonates or poly(methyl methacrylates) are known to outgas (i.e., release a gaseous material) under certain environmental conditions (e.g., elevated temperature or humidity) resulting in the formation of bubbles in adjacent layers such as an adhesive layer. The bubbles can result in a weakening of the bond between the outgassing substrate and another layer to which it is laminated. Delamination and bubbling in the adhesive layer of an optical component or product is usually undesirable. Even in non-optical applications, bubbling and delamination in the adhesive layer can be undesirable.

SUMMARY OF THE INVENTION

Articles are provided that include an optical film and an optically clear pressure sensitive adhesive layer on at least one outer surface of the optical film. Additionally, articles are provided that include a pressure sensitive adhesive layer that resists bubble formation when adhered to an outgassing substrate. The pressure sensitive adhesive layer in the various articles include a (meth)acrylate block copolymer.

In one aspect, an article is provided that includes an optical film, a substrate, and an optically clear pressure sensitive adhesive layer positioned between the optical film and the substrate. The pressure sensitive adhesive layer contains a (meth)acrylate block copolymer that includes the reaction product of at least two A block polymeric units and at least one B block polymeric unit. Each A block is the reaction product of a first monomer composition that contains an alkyl methacrylate, an aralkyl methacrylate, an aryl methacrylate, or a combination thereof. The B block is the reaction product of a second monomer composition that contains an alkyl (meth)acrylate, a heteroalkyl (meth)acrylate, a vinyl ester, or a combination thereof. Each A block has a Tg of at least 50° C. and the B block has a Tg no greater than 20° C. The (meth)acrylate block copolymer contains 20 to 50 weight percent A block and 50 to 80 weight percent B block based on the weight of the block copolymer.

Such as article can be prepared by applying an optically clear pressure sensitive adhesive layer to an outer surface of at least one of an optical film or a substrate; and forming a laminate in which the optically clear pressure sensitive adhesive layer is positioned between the optical film and the substrate.

Additionally, an article is provided that includes an optical film, a first optically clear pressure sensitive adhesive layer, and a second adhesive layer. The optical film has a first major outer surface and a second major outer surface opposite the first major outer surface. The first optically clear pressure sensitive adhesive layer is adjacent to the first major outer surface of the optical film and the second adhesive layer is adjacent to the second major outer surface of the optical film. The first optically clear pressure sensitive adhesive layer contains a (meth)acrylate block copolymer that includes the reaction product of at least two A block polymeric units and at least one B block polymeric unit. Each A block is the reaction product of a first monomer composition that contains an alkyl methacrylate, an aralkyl methacrylate, an aryl methacrylate, or a combination thereof. The B block is the reaction product of a second monomer composition that contains an alkyl (meth)acrylate, a heteroalkyl (meth)acrylate, a vinyl ester, or a combination thereof. Each A block has a Tg of at least 50° C. and the B block has a Tg no greater than 20° C. The (meth)acrylate block copolymer contains 20 to 50 weight percent A block and 50 to 80 weight percent B block based on the weight of the block copolymer. The second adhesive can be a pressure sensitive adhesive, a heat-activated adhesive, a structural adhesive, or a non-tacky adhesive.

Such an article can be prepared by providing a optical film having a first major outer surface and a second major outer surface; applying a first optically clear pressure sensitive adhesive layer to the first major outer surface of the optical film; and applying a second adhesive layer to the second major outer surface of the optical film.

In yet another aspect, an article is provided that includes a first substrate, a second substrate, and a pressure sensitive adhesive layer positioned between the first substrate and the second substrate. At least one of the first substrate or the second substrate is an outgassing substrate. The pressure sensitive adhesive layer contains a (meth)acrylate block copolymer that includes the reaction product of at least two A block polymeric units and at least one B block polymeric unit. Each A block is the reaction product of a first monomer composition that contains an alkyl methacrylate, an aralkyl methacrylate, an aryl methacrylate, or a combination thereof. The B block is the reaction product of a second monomer composition that contains an alkyl (meth)acrylate, a heteroalkyl (meth)acrylate, a vinyl ester, or a combination thereof. Each A block has a Tg of at least 50° C. and the B block has a Tg no greater than 20° C. The block copolymer contains 20 to 50 weight percent A block and 50 to 80 weight percent B block based on the weight of the block copolymer. The (meth)acrylate block copolymer has a storage modulus G' where 5.1 Pa<log(G') at 25° C. and 4.4 Pa<log (G') at 150° C. As used herein, the term "Pa" refers to Pascals.

Such an article can be prepared by providing a first substrate and a second substrate, wherein at least one of the first substrate or the second substrate is an outgassing substrate; and forming a laminate in which a pressure sensitive adhesive layer is positioned between the first substrate and the second substrate.

The above summary of the present invention is not intended to describe each disclosed embodiment or every implementation of the present invention. The detailed description that follows more particularly exemplifies these embodiments.

BRIEF DESCRIPTION OF THE DRAWINGS

The above aspects may be more completely understood in consideration of the following detailed description of various embodiments in connection with the accompanying drawing, in which.

DETAILED DESCRIPTION OF THE INVENTION

Figure 1:
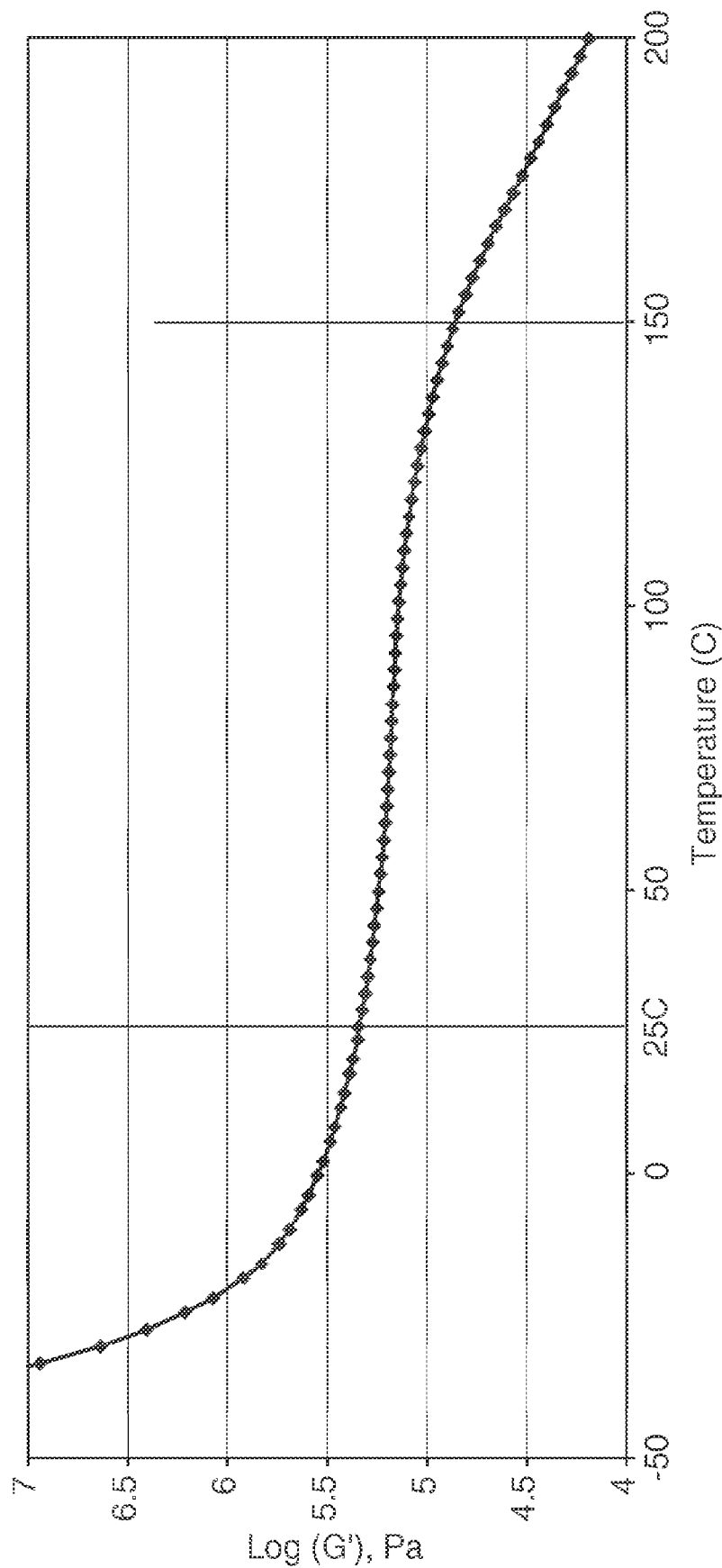
FIG. 1 is a plot of log(G') versus temperature for an exemplary (meth)acrylate block copolymer, where G' is the storage modulus.

Articles are provided that include an optical film and an optically clear pressure sensitive adhesive layer adjacent to at least one outer surface of the optical film. The articles can further include, for example, a substrate, another adhesive layer, or a combination thereof.

Additionally, articles are provided that include a pressure sensitive adhesive layer positioned between two substrates, wherein at least one of the substrates is an outgassing substrate. The pressure sensitive adhesive layer is resistant to bubble formation when adjacent to the outgassing substrate.

Methods of making the various articles are also provided.

Pressure Sensitive Adhesive Layer

The articles include a pressure sensitive adhesive layer that contains a (meth)acrylate block copolymer. As used herein, the term "(meth)acrylate" refers to polymeric material that is prepared from acrylates, methacrylates, or derivatives thereof.

As used herein, the term "polymer" refers to a polymeric material that is a homopolymer or a copolymer. As used herein, the term "homopolymer" refers to a polymeric material that is the reaction product of one monomer. As used herein, the term "copolymer" refers to a polymeric material that is the reaction product of at least two different monomers. As used herein, the term "block copolymer" refers to a copolymer formed by covalently bonding at least two different polymeric blocks to each other. The two different polymeric blocks are referred to as the A block and the B block.

As used herein, the term "pressure sensitive adhesive" refers to an adhesive that possesses the following properties: (1) aggressive and permanent tack; (2) adherence with no more than finger pressure; (3) sufficient ability to hold onto an adherend; and (4) sufficient cohesive strength to be removed cleanly from the adherend.

The pressure sensitive adhesive layer contains a block copolymer that includes the reaction product of at least two A block polymeric units and at least one B block polymeric unit (i.e., at least two A block polymeric units are covalently bonded to at least one B block polymeric unit). Each A block, which has a Tg of at least 50° C., is the reaction product of a first monomer composition that contains an alkyl methacrylate, an aralkyl methacrylate, an aryl methacrylate, or a combination thereof. The B block, which has a Tg no greater than 20° C., is the reaction product of a second monomer composition that contains an alkyl (meth)acrylate, a heteroalkyl (meth)acrylate, a vinyl ester, or a combination thereof. The block copolymer contains 20 to 50 weight percent A block and 50 to 80 weight percent B block based on the weight of the block copolymer.

The block copolymer in the pressure sensitive adhesive layer can be a triblock copolymer (i.e., (A-B-A) structure) or a star block copolymer (i.e., (A-B)$_n$-structure where n is an integer of at least 3). Star-block copolymers, which have a central point from which various branches extend, are also referred to as radial copolymers.

Each A block polymeric unit as well as each B block polymeric unit can be a homopolymer or copolymer. The A block is usually an end block (i.e., the A block forms the ends of the copolymeric material), and the B block is usually a midblock (i.e., the B block forms a middle portion of the copolymeric material). The A block is typically a hard block that is a thermoplastic material, and the B block is typically a soft block that is an elastomeric material.

The A block tends to be more rigid than the B block (i.e., the A block has a higher glass transition temperature than the B block). As used herein, the term "glass transition temperature" or "Tg" refers to the temperature at which a polymeric material transitions from a glassy state (e.g., brittleness, stiffness, and rigidity) to a rubbery state (e.g., flexible and elastomeric). The Tg can be determined, for example, using techniques such as Differential Scanning Calorimetry (DSC) or Dynamic Mechanical Analysis (DMA). The A block has a Tg of at least 50° C. whereas the B block has a Tg no greater than 20° C. The A block tends to provide the structural and cohesive strength for the (meth)acrylate block copolymer.

The block copolymer usually has an ordered multiphase morphology, at least at temperatures in the range of about 25° C. to about 150° C. Because the A block has a solubility parameter sufficiently different than the B block, the A block phase and the B block phase are usually separated. The block copolymer can have distinct regions of reinforcing A block domain (e.g., nanodomains) in a matrix of the softer, elastomeric B blocks. That is, the block copolymer often has discrete, discontinuous A block phase in a substantially continuous B block phase.

Each A block is the reaction product of a first monomer mixture containing at least one methacrylate monomer of Formula I

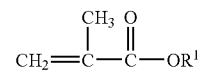

where R$^1$ is an alkyl (i.e., the monomer according to Formula I can be an alkyl methacrylate), an aralkyl (i.e., the monomer according to Formula I can be an aralkyl methacrylate), or an aryl group (i.e., the monomer according to Formula I can be an aryl methacrylate). Suitable alkyl groups often have 1 to 6 carbon atoms. When the alkyl group has more than 2 carbon atoms, the alkyl group can be branched or cyclic. Suitable aralkyl groups (i.e., an aralkyl is an alkyl group substituted with an aryl group) often have 7 to 12 carbon atoms while suitable aryl groups often have 6 to 12 carbon atoms.

Exemplary monomers according to Formula I include methyl methacrylate, ethyl methacrylate, isopropyl methacrylate, isobutyl methacrylate, tert-butyl methacrylate, cyclohexyl methacrylate, phenyl methacrylate, and benzyl methacrylate.

In addition to the monomers of Formula I, the A block can contain up to 10 weight percent of a polar monomer such as (meth)acrylic acid, a (meth)acrylamide, or a hydroxyalkyl (meth)acrylate. These polar monomers can be used, for example, to adjust the Tg (i.e., the Tg remains at least 50° C., however) and the cohesive strength of the A block. Additionally, these polar monomers can function as reactive sites for chemical or ionic crosslinking, if desired.

As used herein, the term "(meth)acrylic acid" refers to both acrylic acid and methacrylic acid. As used herein, the term "(meth)acrylamide" refers to both an acrylamide and a methacrylamide. The (meth)acrylamide can be a N-alkyl (meth)acrylamide or a N,N-dialkyl (meth)acrylamide where the alkyl substituent has 1 to 10, 1 to 6, or 1 to 4 carbon atoms. Exemplary (meth)acrylamides include acrylamide, methacrylamide, N-methyl acrylamide, N-methyl methacrylamide, N,N-dimethyl acrylamide, N,N-dimethyl methacrylamide, and N-octyl acrylamide.

As used herein, the term "hydroxyalkyl (meth)acrylate" refers to a hydroxyalkyl acrylate or a hydroxyalkyl methacrylate where the hydroxy substituted alkyl group has 1 to 10, 1 to 6, or 1 to 4 carbon atoms. Exemplary hydroxyalkyl (meth)acrylates include 2-hydroxyethyl acrylate, 2-hydroxyethyl methacrylate, 3-hydroxypropyl acrylate, and 3-hydroxypropyl methacrylate.

The A blocks in the block copolymer can be the same or different. In some block copolymers, each A block is a poly(methyl methacrylate). In more specific examples, the block copolymer can be a triblock or a starblock copolymer where each endblock is a poly(methyl methacrylate).

The weight average molecular weight (Mw) of each A block is usually at least about 5,000 g/mole. In some block copolymers, the A block has a weight average molecular weight of at least about 8,000 g/mole or at least about 10,000 g/mole. The weight average molecular weight of the A block is usually less than about 30,000 g/mole or less than about 20,000 g/mole. The weight average molecular weight of the A block can be, for example, about 5,000 to about 30,000 g/mole, about 10,000 to about 30,000 g/mole, about 5,000 to about 20,000 g/mole, or about 10,000 to about 20,000 g/mole.

Each A block has a Tg of at least 50° C. In some embodiments, the A block has a Tg of at least 60° C., at least 80° C., at least 100° C., or at least 120° C. The Tg is often no greater than 200° C., no greater than 190° C., or no greater than 180° C. For example, the Tg of the A block can be 50° C. to 200° C., 60° C. to 200° C., 80° C. to 200° C., 100° C. to 200° C., 80° C. to 180° C., or 100° C. to 180° C.

The A blocks can be thermoplastic. As used herein, the term "thermoplastic" refers to polymeric material that flows when heated and then returns to its original state when cooled to room temperature. However, under come conditions (e.g., applications where solvent resistance or higher temperature performance is desired), the thermoplastic block copolymers can be covalently crosslinked. Upon crosslinking, the materials loose their thermoplastic characteristics and become thermoset materials. As used herein, the term "thermoset" refers to polymeric materials that become infusible and insoluble upon heating and that do not return to their original chemical state upon cooling. Thermoset materials tend to be insoluble and resistant to flow. In some applications, the (meth)acrylate block copolymer is a thermoplastic material that is transformed to a thermoset material during or after formation of a coating that contains a block copolymer capable of being covalently crosslinked.

The B block is the reaction product of a second monomer composition that contains an alkyl (meth)acrylate, a heteroalkyl (meth)acrylate, a vinyl ester, or a combination thereof. As used herein, the term "alkyl (meth)acrylate" refers to an alkyl acrylate or an alkyl methacrylate. As used herein, the term "heteroalkyl (meth)acrylate" refers to a heteroalkyl acrylate or heteroalkyl methacrylate with the heteroalkyl having at least two carbon atoms and at least one caternary heteroatom (e.g., sulfur or oxygen).

Exemplary vinyl esters include, but are not limited to, vinyl acetate, vinyl 2-ethylhexanoate, and vinyl neodecanoate.

Exemplary alkyl (meth)acrylates and heteroalkyl (meth)acrylates are often of Formula II

where $R^2$ is hydrogen or methyl; and $R^3$ is a $C_{3-18}$ alkyl or a $C_{2-18}$ heteroalkyl. When $R^2$ is hydrogen (i.e., the monomer according to Formula II is an acrylate), the $R^3$ group can be linear, branched, cyclic, or a combination thereof. When $R^2$ is methyl (i.e., the monomer according to Formula II is a methacrylate) and $R^3$ has 3 or 4 carbon atoms, the $R^3$ group can be linear. When $R^2$ is methyl and $R^3$ has at least 5 carbon atoms, the $R^3$ group can be linear, branched, cyclic, or a combination thereof.

Suitable monomers according to Formula II include, but are not limited to, n-butyl acrylate, decyl acrylate, 2-ethoxy ethyl acrylate, 2-ethoxy ethyl methacrylate, isoamyl acrylate, n-hexyl acrylate, n-hexyl methacrylate, isobutyl acrylate, isodecyl acrylate, isodecyl methacrylate, isononyl acrylate, 2-ethylhexyl acrylate, 2-ethylhexyl methacrylate, isooctyl acrylate, isooctyl methacrylate, isotridecyl acrylate, lauryl acrylate, lauryl methacrylate, 2-methoxy ethyl acrylate, 2-methylbutyl acrylate, 4-methyl-2-pentyl acrylate, n-octyl acrylate, n-propyl acrylate, and n-octyl methacrylate.

(Meth)acrylate blocks prepared from monomers according to Formula II that are commercially unavailable or that cannot be polymerized directly can be provided through an esterification or trans-esterification reaction. For example, a (meth)acrylate that is commercially available can be hydrolyzed and then esterified with an alcohol to provide the (meth)acrylate of interest. This process may leave some residual acid in the B block. Alternatively, a higher alkyl (meth)acrylate ester can be derived from a lower alkyl (meth)acrylate ester by direct transesterification of the lower alkyl (meth)acrylate with a higher alkyl alcohol.

The B block can include up to about 30 weight percent polar monomers as long as the Tg of the B block is no greater than 20° C. Polar monomers include, but are not limited to, (meth)acrylic acid; (meth)acrylamides such as N-alkyl (meth)acrylamides and N,N-dialkyl (meth)acrylamides; hydroxy alkyl (meth)acrylates; and N-vinyl lactams such as N-vinyl pyrrolidone and N-vinyl caprolactam. The polar monomers can be included in the B block to adjust the Tg or the cohesive strength of the B block. Additionally, the polar monomers can function as reactive sites for chemical or ionic crosslinking, if desired.

The B block typically has a Tg that is no greater than 20° C. In some embodiments, the B block has a Tg that is no greater than 10° C., no greater than 0° C., no greater than −5° C., or no greater than −10° C. The Tg often is no less than −80° C., no less than −70° C., or no less than −50° C. For example, the Tg of the B block can be −70° C. to 20° C., −60° C. to 20° C., −70° C. to 10° C., −60° C. to 10° C., −70° C. to 0° C., −60° C. to 0° C., −70° C. to −10° C., or −60° C. to −10° C.

The B block tends to be elastomeric. As used herein, the term "elastomeric" refers to a polymeric material that can be stretched to at least twice its original length and then retracted to approximately its original length upon release. In some pressure sensitive adhesive compositions, additional elastomeric material is added. This added elastomeric material should not adversely affect the optical clarity or the adhesive properties (e.g., the storage modulus) of the pressure sensitive adhesive composition. The chemistry of the B block can affect the tackiness of the block copolymer (e.g., block copolymers with a lower rubbery plateau storage modulus, as determined using Dynamic Mechanical Analysis, tend to be tackier).

In some embodiments, the monomer according to Formula II is an alkyl (meth)acrylate with the alkyl group having 4 to 18, 4 to 10, 4 to 6, or 4 carbon atoms. In some examples, the monomer is an acrylate. Acrylate monomers tend to be less rigid than their methacrylate counterparts. For example, the B block can be a poly(n-butyl acrylate).

The weight average molecular weight of the B block is usually at least about 30,000 g/mole. In some block copolymers, the B block has a weight average molecular weight of at least about 40,000 g/mole or at least about 50,000 g/mole. The weight average molecular weight is generally no greater than about 200,000 g/mole. The B block usually has a weight average molecular weight no greater than 150,000 g/mole, no greater than about 100,000 g/mole, or no greater than about 80,000 g/mole. In some block copolymers, the B block has a weight average molecular weight of about 30,000 g/mole to about 200,000 g/mole, about 30,000 g/mole to about 100,000 g/mole, about 30,000 g/mole to about 80,000 g/mole, about 40,000 g/mole to about 200,000 g/mole, about 40,000 g/mole to about 100,000 g/mole, or about 40,000 g/mole to about 80,000 g/mole.

The B block is a polymeric material that as a homopolymer has an average entanglement molecular weight no greater than about 60,000 g/mole. As used herein, the term "average entanglement molecular weight" is an indicator of the average distance between entanglements in a random coil of the polymeric material and refers to the average molecular weight between entanglements. If the weight average molecular weight of the B block is greater than the average entanglement molecular weight, the B block polymer will be entangled. In some B blocks, the average entanglement molecular weight is no greater than about 50,000 g/mole or no greater than about 40,000 g/mole. The entanglement molecular weight can be altered by the choice of monomers used to prepare the B block. For example, poly(n-butyl acrylate) tends to have a lower entanglement molecular weight than poly(iso-octyl acrylate).

The block copolymers usually contain 20 to 50 weight percent A block and 50 to 80 weight percent B block based on the weight of the block copolymer. For example, the copolymer can contain 20 to 40 weight percent A block and 60 to 80 weight percent B block, 25 to 40 weight percent A block and 60 to 75 weight percent B block, 30 to 40 weight percent A block and 60 to 70 weight percent B block, 20 to 35 weight percent A block and 65 to 80 weight percent B block, 25 to 35 weight percent A block and 65 to 75 weight percent B block, or 30 to 35 weight percent A block and 65 to 70 weight percent B block. Higher amounts of the A block tend to increase the cohesive strength of the copolymer. If the amount of the A block is too high, the tackiness of the block copolymer may be unacceptably low. Further, if the amount of the A block is too high, the morphology of the block copolymer may be inverted from the desirable arrangement where the B block forms the continuous phase to where the A block forms the continuous phase and the block copolymer has characteristics of a thermoplastic material rather than of a pressure sensitive adhesive material.

The block copolymers have a saturated polymeric backbone. As such, these polymeric materials tend to be resistant to weather-induced (e.g., ultraviolet radiation-induced and oxidation-induced) degradation.

Any technique that produces well-controlled block and block copolymer structures can be used to prepare the block copolymers. As used herein, the term "well-controlled" refers to block or block copolymer structures that have at least one of the following characteristics: controlled molecular weight, low polydisperistiy, well-defined blocks, or blocks having high purity.

Some blocks and block copolymers have a well-controlled molecular weight. That is, molecular weights close to the theoretical molecular weights are obtained when the A blocks and the B block are synthesized. As used herein, the term "theoretical molecular weight" refers to the calculated molecular weight based on the molar charge of monomers and initiators used to form each block. For living polymers, the term "degree of polymerization" or "DP" refers to the number of monomer repeat units in a typical polymeric backbone. The DP can be calculated from the number of moles of monomer divided by the number of moles of initiator. The theoretical molecular weight equals DP multiplied by the formula weight of the monomer unit used to prepare a block homopolymer or equals DP multiplied by the average formula weight of the monomer units used to prepare a block copolymer. The weight average molecular weight (Mw) is often about 0.8 to about 1.2 times the theoretical molecular weight or about 0.9 to about 1.1 times the theoretical molecular weight. As such, blocks and block copolymers having a selected molecular weight can be prepared.

The blocks and block copolymers usually have low polydispersity. As used herein, the term "polydispersity" is a measure of the molecular weight distribution and refers to the weight average molecular weight (Mw) divided by the number average molecular weight (Mn) of the polymer. Materials that are all of the same molecular weight have a polydispersity of 1.0 while materials that have more than one molecular weight have a polydispersity greater than 1.0. The polydispersity can be determined, for example, using gel permeation chromatography. Some blocks and block copolymer have a polydispersity of 2.0 or less, 1.5 or less, or 1.2 or less.

In some block copolymers, the boundaries between the nanodomains containing the A blocks and the continuous phase containing the B blocks are well defined (i.e., the boundaries are essentially free of tapered structures—structures derived from monomers used for both the A and B blocks). Tapered structures can increase mixing of the A block phase and the B block phase leading to decreased overall cohesive strength of the pressure sensitive adhesive.

Some A blocks and B blocks have high purity. For example, the A blocks can be essentially free of segments derived from monomers used during the preparation of the B blocks. Similarly, B blocks can be essentially free of segments derived from monomers used during the preparation of the A blocks.

Generally, the polymerization method does not use iniferters. Iniferters leave residues that can be problematic especially in photo-induced polymerization reactions. For example, the presence of thiocarbamate, a commonly used inferter, can cause the resulting block copolymer to be more susceptible to weather-induced degradation. It is believed that the weather-induced degradation may result from the relatively weak carbon-sulfur link in the thiocarbamate residue. The presence of thiocarbamates can be detected, for example, using elemental analysis or mass spectroscopy.

Techniques that tend to produce well-controlled block and block copolymer structures can include living free radical polymerization techniques, living anionic polymerization techniques, and group transfer polymerization techniques.

Specific examples of living free radical polymerization reactions include atom transfer polymerization reactions and reversible addition-fragmentation chain transfer polymerization reactions.

As used herein, the term "living polymerization" refers to polymerization techniques, process, or reactions in which propagating species do not undergo either termination or transfer. If additional monomer is added after 100 percent conversion, additional polymerization can occur. The molecular weight of the living polymer increases linearly as a function of conversion because the number of propagating species does not change. Such polymerizations can often be used to prepare block copolymers.

Living polymerization techniques typically lead to more stereoregular block structures than blocks prepared using non-living or pseudo-living polymerization techniques (e.g., polymerization reactions that use iniferters). Stereoregularity, as evidenced by highly syndiotactic structures or isotactic structures, tends to result in well-controlled block structures and tends to influence the glass transition temperature of the block. For example, syndiotactic poly(methyl methacrylate) (PMMA) synthesized using living polymerization techniques can have a glass transition temperature that is about 20° C. to about 25° C. higher than a comparable PMMA synthesized using conventional (i.e., non-living) polymerization techniques. Stereoregularity can be detected, for example, using nuclear magnetic resonance spectroscopy. Structures with greater than about 75 percent stereoregularity can often be obtained using living polymerization techniques.

When living polymerization techniques are used to form a block, the monomers are contacted with an initiator in the presence of in inert diluent. The inert diluent can facilitate heat transfer and mixing of the initiator with the monomers. Although any suitable inert diluent can be used, saturated hydrocarbons, aromatic hydrocarbons, ethers, esters, ketones, or a combination thereof are often selected. Exemplary diluents include, but are not limited to, saturated aliphatic and cycloaliphatic hydrocarbons such as hexane, octane, cyclohexane, and the like; aromatic hydrocarbons such as toluene; and aliphatic and cyclic ethers such as dimethyl ether, diethyl ether, tetrahydrofuran, and the like; esters such as ethyl acetate and butyl acetate; and ketones such as acetone, methyl ethyl ketone, and the like.

When the block copolymers are prepared using living anionic polymerization techniques, the simplified structure A-M can represent the living A block where M is an initiator fragment selected from a Group I metal such as Li, Na, or K. The A block is the polymerization product of a first monomer composition that includes methacrylate monomers according to Formula I. A second monomer composition that includes the monomers used to form the B block (e.g., the second monomer composition can include monomers according to Formula II) can be added to A-M resulting in the formation of the living diblock structure A-B-M. The addition of another charge of the first monomer composition, which includes monomers according to Formula I, and the subsequent elimination of the living anion site can result in the formation of triblock structure A-B-A. Alternatively, living diblock A-B-M structures can be coupled using difunctional or multifunctional coupling agents to form the triblock structure A-B-A copolymers or (A-B)$_n$-star block copolymers.

Any initiator known in the art for living anionic polymerization reactions can be used. Typical initiators include alkali metal hydrocarbons such as organomonolithium compounds (e.g., ethyl lithium, n-propyl lithium, iso-propyl lithium, n-butyl lithium, sec-butyl lithium, tert-octyl lithium, n-decyl lithium, phenyl lithium, 2-naphthyl lithium, 4-butylphenyl lithium, 4-phenylbutyl lithium, cyclohexyl lithium, and the like). Such a monofunctional initiator can be useful in the preparation of a living A block or a living B block. For living anionic polymerization of (meth)acrylates, the reactivity of the anion is tempered by the addition of complexing ligands selected from materials such as lithium chloride, crown ethers, or lithioethoxylates.

Suitable difunctional initiators for living anionic polymerization reactions include, but are not limited to, 1,1,4,4-tetraphenyl-1,4-dilithiobutane; 1,1,4,4-tetraphenyl-1, 4-dilithioisobutane; and naphthalene lithium, naphthalene sodium, naphthalene potassium, and homologues thereof. Other suitable difunctional initiators include dilithium compounds such as those prepared by an addition reaction of an alkyl lithium with a divinyl compound. For example, an alkyl lithium can be reacted with 1, 3-bis(1-phenylethenyl)benzene or m-diisopropenylbenzene.

Other initiators or combinations of initiators can be used when the block copolymers are prepared using living free radical polymerization techniques. For a description of living free radical polymerization reactions and suitable initiators for these reactions, see International Patent Application Publication Nos. WO 97/18247 (Matyjaszewski et al.) and WO 98/01478 (Le et al.).

For living anionic polymerization reactions, it is usually advisable to add the initiator drop wise to the monomers until the persistence of the characteristic color associated with the anion of the initiator is observed. Then, the calculated amount of the initiator can be added to produce a polymer of the desired molecular weight. The preliminary drop wise addition destroys contaminants that react with initiator and allows better control of the polymerization reaction.

The polymerization temperature used depends on the monomers being polymerized and on the type of polymerization technique used. Generally, the reaction can be carried out at a temperature of about −100° C. to about 100° C. For living anionic polymerization reactions, the temperature is often about −80° C. to about 20° C. For living free radical polymerization reactions, the temperature is often about 20° C. to about 150° C. Living free radical polymerization reactions tend to be less sensitive to temperature variations than living anionic polymerization reactions.

In general, the polymerization reaction is carried out under controlled conditions so as to exclude substances that can destroy the initiator or living anion. Typically, the polymerization reaction is carried out in an inert atmosphere such as nitrogen, argon, helium, or combinations thereof. When the reaction is a living anionic polymerization, anhydrous conditions may be necessary.

To minimize or eliminate any birefringence and coating defects, the pressure sensitive adhesive layer is usually prepared from a pressure sensitive adhesive composition that contains a solvent rather than from a hot-melt composition. A solvent is selected that is a good solvent for both the A block and the B block of the block copolymer. Examples of suitable solvents include, but are not limited to, ethyl acetate, tetrahydrofuran, and methyl ethyl ketone. A coating is applied and then dried to remove the solvent. Once the solvent has been removed, the A block and the B block segments of the block copolymer tend to segregate to form an ordered, cohesively strong, multiphase morphology.

The (meth)acrylate block copolymers can melt flow at temperatures above about 150° C. The melt flow temperature of the block copolymers can be adjusted by adjusting the level of compatibility (i.e., miscibility) between the A block and the B block of the block copolymer. For example, the composition of the A block can be selected to include a first monomeric unit that provides strength and a desired glass transition temperature and a second monomeric unit that alters the melt flow temperature of the block copolymer. Suitable second monomeric units include, for example, cycloalkyl methacrylates such as cyclohexyl methacrylate, and the like. Any useful relative amounts of the first and second monomers can be used.

The melt flow can also be adjusted by varying the weight of A blocks and the B blocks. For example, the melt flow temperature can be increased by increasing the weights of the blocks and can be decreased by decreasing the weight of the blocks.

Other additives can be added to the pressure sensitive adhesive composition. Usually, the additives are selected to be compatible with the A or B block of the block copolymer. An additive is compatible in a phase (e.g., A block or B block) if it causes a shift in the glass transition temperature of that phase (assuming that the additive and the phase do not have the same Tg). Examples of these types of additives include plasticizers and tackifiers.

Fillers can also be added to the pressure sensitive adhesive composition. Fillers typically do not change the Tg but can change the storage modulus. If optical clarity is desired, these fillers are often chosen to have a particle size that does not adversely affect the optical properties of the pressure sensitive adhesive composition.

The pressure sensitive adhesive layer can be optically clear. As used herein, the term "optically clear" refers to a material that has a luminous transmission of at least about 90 percent, a haze of less than about 2 percent, and opacity of less than about 1 percent in the 400 to 700 nm wavelength range. Both the luminous transmission and the haze can be determined using, for example, ASTM-D 1003-95. The optically clear adhesive layer tends to be visually free of bubbles.

The optical clarity can be dependent on the size of the A block nanodomains. The nanodomains often have an average size less than about 150 nm or less than about 100 nanometers. The size of the nanodomains can be altered, for example, by changing the amount of the A block or by changing the monomeric composition used to form the A block in the block copolymer. Unless the refractive indexes of both phases are well matched, larger domain sizes tend to cause light scattering.

The pressure sensitive adhesive layer desirably maintains optical clarity, bond strength, and resistance to delamination over the lifetime of the article in which it is used. Whether or not an adhesive will likely have these desirable characteristics can be determined using an accelerated aging test. The pressure sensitive adhesive layer can be positioned between two substrates for this test. The resulting laminate is then exposed to elevated temperatures, optionally to elevated humidity conditions, for a period of time.

For example, the pressure sensitive adhesive layer can often retain its optical clarity after aging at 90° C. for approximately 500 hours without humidity control (i.e., the relative humidity in the oven is usually below 10 percent or 20 percent). Alternatively, the pressure sensitive adhesive can often retain its optical clarity after aging at 80° C. for approximately 500 hours with a relative humidity of about 90 percent. After aging, the luminous transmission of the adhesive can be at least 90 percent and the haze can be less than 2 percent.

The A blocks and the B blocks interact with each other differently at different temperatures, providing useful temperature-controlled properties. At low temperatures (e.g., at temperatures below the glass transition temperature of the A blocks but above the glass transition temperature of the B block), the different blocks tend to phase separate. The A block nanodomains provide rigidity and strength within the lower modulus continuous B block phase. As shown in FIG. 1, the storage modulus remains fairly constant from about room temperature (e.g., about 22° C. to about 25° C.) to about 125° C. or to about 150° C. The block copolymer tends to be rubbery in this temperature range. The copolymer begins to flow and become significantly softer (i.e., as indicated by at least a 20 percent decrease in the storage modulus) at temperatures above about 125° C. or above about 150° C.). That is, the block copolymer does not undergo significant flow in the temperature range of about 25° C. to about 150° C. or in the range of about 25° C. to about 125° C.

The pressure sensitive adhesive layer tends to have rheological properties that can resist the pressure of gas that may come out of the substrate. In some embodiments, the storage modulus of the pressure sensitive adhesive layer is relatively constant (e.g., change less than about 20 percent, change less than about 15 percent, or change less than about 10 percent) from a temperature of 25° C. to about 200° C., 25° C. to about 175° C., 25° C. to about 150° C., or 25° C. about 125° C. An adhesive layer having a higher modulus in this temperature range tends to be more resistant to the pressure of gas from a substrate.

Articles

Articles are provided that include an optical film and an optically clear pressure sensitive adhesive layer adjacent to at least one major surface of the optical film. The articles can further include another substrate (e.g., permanently or temporarily attached to the pressure sensitive adhesive layer), another adhesive layer, or a combination thereof. As used herein, the term "adjacent" can be used to refer to two layers that are in direct contact or that are separated by one or more layers. Often, adjacent layers are in direct contact.

Additionally, articles are provided that include a pressure sensitive adhesive layer positioned between two substrates, wherein at least one of the substrates is an outgassing substrate. The pressure sensitive adhesive layer is resistant to bubble formation when adjacent to an outgassing substrate.

In some embodiments, the resulting articles can be optical elements or can be used to prepare optical elements. As used herein, the term "optical element" refers to an article that has an optical effect or optical application. The optical elements can be used, for example, in electronic displays, architectural applications, transportation applications, projection applications, photonics applications, and graphics applications. Suitable optical elements include, but are not limited to, glazings (e.g., windows and windshields), screens or displays, cathode ray tubes, polarizers, reflectors, and the like.

In one aspect, an article is provided that includes an optical film, a substrate, and an optically clear pressure sensitive adhesive layer positioned between the optical film and the substrate. The pressure sensitive adhesive layer contains a (meth)acrylate block copolymer as described above. Such an article can be prepared by, for example, by applying an optically clear pressure sensitive adhesive layer to an outer surface of at least one of the optical film or the substrate and then forming a laminate that has the following construction: optical film—optically clear pressure sensitive adhesive layer—substrate. A coating or extrusion process, for example, can be used to apply the pressure sensitive adhesive layer. Alternatively, the pressure sensitive adhesive layer can be transferred from another backing such as a release liner to the optical film, to the substrate, or to a combination thereof.

Any suitable optical film can be used in the articles. As used herein, the term "optical film" refers to a film that can be used to produce an optical effect. The optical films are typically polymer-containing films that can be a single layer or multiple layers. The optical films are flexible and can be of any suitable thickness. The optical films often are at least partially transmissive, reflective, antireflective, polarizing, optically clear, or diffusive with respect to some wavelengths of the electromagnetic spectrum (e.g., wavelengths in the visible ultraviolet, or infrared regions of the electromagnetic spectrum). Exemplary optical films include, but are not limited to, visible mirror films, color mirror films, solar reflective films, infrared reflective films, ultraviolet reflective films, reflective polarizer films such as a brightness enhancement films and dual brightness enhancement films, absorptive polarizer films, optically clear films, tinted films, and antireflective films.

Some optical films have multiple layers such as multiple layers of polymer-containing materials (e.g., polymers with or without dyes) or multiple layers of metal-containing material and polymeric materials. Some optical films have alternating layers of polymeric material with different indexes of refraction. Other optical films have alternating polymeric layers and metal-containing layers. Exemplary optical films are described in the following patent, which are incorporated herein by reference: U.S. Pat. No. 6,049,419 (Wheatley et al.); U.S. Pat. No. 5,223,465 (Wheatley et al.); U.S. Pat. No. 5,882,774 (Jonza et al.); U.S. Pat. No. 6,049,419 (Wheatley et al.); RE 34,605 (Schrenk et al.); U.S. Pat. No. 5,579,162 (Bjornard et al.), and U.S. Pat. No. 5,360,659 (Arends et al.).

A variety of optical films are commercially available. For example, suitable optical films are commercially available under the trade designation "VIKUITI" from 3M Company (St. Paul, Minn.). For example, Vikuiti™ Display Enhancement Films can enhance the performance and visual appearance of various types of displays such as Liquid Crystal Displays. These optical films can manage the output angles of light (e.g., Vikuiti™ Brightness Enhancement Films), manage the polarization of light (e.g., Vikuiti™ Dual Brightness Enhancement Films), manage the backlight efficiency (e.g., Enhanced Specular Reflector Films), or manage viewing angels or block external light from a display (e.g., Vikuiti™ Light Control Film). Other optical films can selectively absorb light vibrations in certain planes (e.g., Vikuiti™ Linear Polarizers), can function as a polarization form converter (e.g., Vikuiti™ Retarders), or can function to reduce glare and increase contrast (e.g., Vikuiti™ Circular Polarizers that combines a linear polarizer with a retarder film).

Some optical films can function as a mirror. For example, Vikuiti™ High Reflectivity Visible Mirror Film from 3M Company can reflect visible wavelengths of light. Some of these mirror films can be tuned to reflect certain colors in the visible spectrum. Other optical films can function as an infrared mirror by reflecting energy in the wavelength range of about 900 to about 1200 nm. Still other optical films can transmit one polarization of visible light while reflecting the orthogonal polarization (e.g., reflective polarizer).

Other optical films commercially available from 3M Company include those having the trade designations "SCOTCHTINT", "SCOTCHSHIELD", "SCOTCHGUARD", and "FASARA". These optical films are often used in architectural or transportation applications to control the amount of light or solar energy entering a building or vehicle through a window. For example, Scotchtint™ films can block up to 99 percent of the sun's ultraviolet rays, reduce glare, reduce solar gain, and alter the appearance of a window. These films can be clear or colored and are sometimes referred to as Solar Reflecting Film. Scotchshield™ can help hold glazings in place during destructive weather conditions. Scotchgaurd™ films can be used for protection against graffiti or scratches. Fasara™ films can be used to create a glass-etched appearance.

The substrate included in the article can contain polymeric materials, glass materials, ceramic materials, metal-containing materials (e.g., metals or metal oxides), or a combination thereof. The substrate can include multiple layers of material such as a support layer, a primer layer, a hard coat layer, a decorative design, and the like. The substrate can be permanently or temporarily attached to an adhesive layer. For example, a release liner can be temporarily attached and then removed for attachment of the adhesive layer to another substrate.

The substrate can have a variety of functions such as, for example, providing flexibility, rigidity, strength or support, reflectivity, antireflectivity, polarization, or transmissivity (e.g., selective with respect to different wavelengths). That is, the substrate can be flexible or rigid; reflective or non-reflective; visibly clear, colored but transmissive, or opaque (e.g., not transmissive); and polarizing or non-polarizing.

Exemplary substrates include, but are not limited to, the outer surface of an electronic display such as liquid crystal display or a cathode ray tube, the outer surface of a window or glazing, the outer surface of an optical component such as a reflector, polarizer, diffraction grating, mirror, or lens, another film such as a decorative film or another optical film, or the like.

Representative examples of polymeric substrates include those that contain polycarbonates, polyesters (e.g., polyethylene terephthalates and polyethylene naphthalates), polyurethanes, poly(meth)acrylates (e.g., polymethyl methacrylates), polyvinyl alcohols, polyolefins such as polyethylenes and polypropylenes, polyvinyl chlorides, polyimides, cellulose triacetates, acrylonitrile-butadiene-styrene copolymers, and the like.

Some polymeric substrates undergo a phenomenon referred to as "outgassing" or "out-gas releasing". For example, rigid layers such as poly(meth)acrylates, polycarbonates, and the like tend to outgas, particularly when they are relatively thick (e.g., in the range of about 1 millimeter to several centimeters). Outgassing substrates can adversely affect the stability, clarity, bond strength, or other desirable performance characteristics of an adhesive layer adjacent to these substrates. Applying an incompatible adhesive layer to an outgassing substrate may result in defects such as bubbles. Additionally, applying an incompatible adhesive layer to an outgassing substrate may also result in partial or full delamination of the adhesive bond between the outgassing substrate and another layer such as an optical film.

Outgassing can be particularly adverse when the other layer bonded to the outgassing substrate through the adhesive layer exhibits low moisture transmissivity. At least some optical films have a low moisture transmissivity. The low moisture transmissivity layer can act as a barrier to the release of the gas resulting in the accumulation of gas at the adhesive interface or within the adhesive layer. The accumulated gas can contribute to bubbling, delamination, reduced bond strength, loss of clarity, or a combination thereof. The pressure sensitive adhesive layers described above that contain the (meth)acrylate block copolymers can often be used in applications with outgassing substrates.

In other embodiments, the substrate is a release liner. Any suitable release liner can be used. Exemplary release liners include those prepared from paper (e.g., Kraft paper) or polymeric material (e.g., polyolefins such as polyethylene or polypropylene, ethylene vinyl acetate, polyurethanes, polyesters such as polyethylene terephthalate, and the like). At least some release liners are coated with a layer of a release agent such as a silicone-containing material or a fluorocarbon-containing material. Exemplary release liners include, but are not limited to, liners commercially available from CP Film (Martinsville, Va.) under the trade designation "T-30" and "T-10" that have a silicone release coating on polyethylene terephthalate film.

The release liner can be removed to adhere the optical film to another substrate (i.e., removal of the release liner exposes a surface of an adhesive layer that subsequently can be bonded to another substrate surface). Often, the adhesive layer is permanently bonded to this other substrate.

The articles have at least one of the following properties: the pressure sensitive adhesive layer has optical transmissivity over a useful lifetime of the article, the pressure sensitive adhesive can maintain a sufficient bond strength between layers of the article, the pressure sensitive adhesive can resist or avoid delamination, and the pressure sensitive adhesive can resist bubbling of the adhesive layer over a useful lifetime. The resistance to bubble formation and retention of optical transmissivity can be evaluated using accelerated aging tests. Laminates can often withstand exposure to elevated temperatures (e.g., 60 to 90° C.), optionally under elevated humidity conditions (e.g., 80 to 90 percent relative humidity), for a period of time (e.g., 1 day to 1 month).

The thickness of the adhesive layer in the articles of invention tends to be at least about 5 micrometers, at least 10 micrometers, at least 15 micrometers, or at least 20 micrometers. The thickness is often no greater than about 200 micrometers, no greater than about 175 micrometers, no greater than about 150 micrometers, or no greater than about 125 micrometers. For example, the thickness can be 5 to 200 micrometers, 10 to 100 micrometers, 10 to 50 micrometers, 20 to 50 micrometers, or 20 to 25 micrometers.

In yet another aspect, an article is provided that includes an optical film, a first optically clear pressure sensitive adhesive layer, and a second adhesive layer. The optical film has a first major outer surface and a second major outer surface opposite the first major outer surface. The first optically clear pressure sensitive adhesive layer is adjacent to the first major outer surface of the optical film and the second adhesive layer is adjacent to the second major outer surface of the optical film. The first optically clear pressure sensitive adhesive is further described above and contains a (meth)acrylate block copolymer.

The second adhesive can be a pressure sensitive adhesive, a structural adhesive, a heat-activated adhesive, or a non-tacky adhesive (i.e., cold-seal adhesive). Non-tacky adhesives have limited or low tack to most substrates but can have acceptable adhesive strength when paired with specific target substrates or when two layers of the non-tacky adhesives are contacted. The non-tacky adhesive adheres by affinity. Examples of non-tacky adhesives include those disclosed in U.S. Pat. No. 4,977,003 (Brown et al.) and U.S. Pat. No. 6,004,670 (Kobe et al.), the disclosures of which are incorporated herein by reference.

Heat activated adhesives are non-tacky at room temperature but become tacky and capable of bonding to a substrate at elevated temperatures. These adhesives usually have a Tg or melting point (Tm) above room temperature. When the temperature is elevated above the Tg or Tm, the storage modulus usually decreases and the adhesive become tacky. Examples of heat activated adhesives suitable for use in the second adhesive layer include those disclosed in U.S. Pat. No. 4,248,748 (McGrath et al.); U.S. Pat. No. 5,905,099 (Everaerts et al.); and U.S. Pat. No. 6,012,818 (Araki), the disclosures of which are incorporated herein by reference.

Structural adhesives refer to adhesives that that can bond other high strength materials (e.g., wood, composites, or metal) so that the adhesive bond strength is in excess of 6.0 MPa (1000 psi). Exemplary structural adhesives for the second adhesive layer include U.S. Pat. No. 6,180,200 (Ha et al.) and U.S. Pat. No. 5,897,727 (Staral et al.); U.S. Patent Application Publication No. 2003/0192638-A1 (Yang et al.); and International Patent Application WO 03/040250 (Yang et al.).

Exemplary pressure sensitive adhesives for the second adhesive layer include those described in U.S. application Ser. No. 10/331,374 filed Dec. 30, 2002, and U.S. application Ser. No. 10/411,933 filed Apr. 11, 2003, the disclosures of which are incorporated herein by reference. These pressure sensitive adhesives can be optically clear.

An article with two adhesive layers can be prepared by, for example, by forming a first optically clear pressure sensitive adhesive layer on a first major outer surface of an optical film and forming a second adhesive layer on a second major outer surface of the optical film. Each adhesive layer can be coated, extruded, or transferred from a release liner to the optical film. In some articles, the second adhesive is optically clear and substantially the same as the first optically clear pressure sensitive adhesive.

The articles in this aspect can further include one or more substrates. In some embodiments, the article has one of the following constructions:

substrate—second adhesive layer—optical film—first optically clear pressure sensitive adhesive layer;

second adhesive layer—optical film—first optically clear pressure sensitive adhesive layer—substrate; and second substrate—second adhesive layer—optical film— first optically clear pressure sensitive adhesive layer— first substrate In articles having multiple substrates, the multiple substrates can be the same or different. Some of the substrates can be release liners that can be removed for attachment to another substrate.

Additionally, articles are provided that include a first substrate, a second substrate, and a pressure sensitive adhesive layer positioned between the first substrate and the second substrate. At least one of the first substrate or the second substrate is an outgassing substrate. The pressure sensitive adhesive layer contains a (meth)acrylate block copolymer that includes the reaction product of at least two A block polymeric units and at least one B block polymeric unit. The block copolymer has a storage modulus G' where 5.1 Pa<log (G') at 25° C. and 4.4 Pa<log(G') at 150° C. The storage modulus can be determined using Dynamic Mechanical Analysis. In some embodiments, the pressure sensitive adhesive layers that are resistant to bubble formation are also optically clear.

In some exemplary articles, the first substrate is an outgassing substrate containing polycarbonate or poly(methyl methacrylate). The second substrate can be any type of substrate. In some examples, the second substrate is a film that can be polymeric, metallic, or a combination thereof. Suitable films include, for example, optical films or decorative films. Other exemplary films include release liners.

As used herein the term "decorative film" refers to any type of film used for decorative purposes. The decorative film can be transparent, opaque, reflective, non-reflective, colored, or a combination thereof. The decorative film can include a printed message, insignia, design, or pattern. The decorative film can include one or more layers. For example, the decorative film can include a support layer, a decorative layer, and a protective layer. Suitable decorative films include, but are not limited to, those described in U.S. Patent Application Publication 2004/0096630 A1 (Sakurai et al.), 2003/0211337 A1 (Muraoka), and 2004/0113899 A1 (Makayama); International Patent Application WO 03/037648 A2 (Johnson); and U.S. Pat. No. 6,083,335 (Scullin et al.) and U.S. Pat. No. 6,071,621 (Falaas et al), the disclosures of which are incorporated herein by reference.

The (meth)acrylate block copolymer included in the pressure sensitive adhesive layer has a storage modulus G' that varies as a function of temperature. Log G' is determined by Dynamic Mechanical Analysis as described in the Examples section. A representative plot of log(G') versus temperature for various suitable (meth)acrylate block copolymers is shown in FIG. 1. A relatively flat plateau region is observed at temperatures in the range of 25° C. to 125° C. or in the range of 25° C. to 150° C. That is, the log(G') is relatively constant in these temperature ranges. The value log(G') often varies by less than about 20 percent, less than about 15 percent, or less than about 10 percent over the temperature range of 25° C. to 125° C. or over the temperature range of 25° C. to 150° C. Above about 125° C. or about 150° C., G' starts to drop as the Tg of the A block is exceeded and the material begins to flow.

At 25° C., log(G') is greater than 5.1 Pa. In some embodiments, log (G') is less than or equal to 5.6 Pa or less than or equal to 5.5 Pa at 25° C. That is, 5.1 Pa<log(G')≦5.6 Pa or 5.1 Pa<log (G')≦5.5 Pa at 25° C. A block copolymer having a log(G') less than about 5.1 Pa at 25° C. tends to loose adhesive strength when exposed to elevated temperature and humidity conditions (e.g., 80° C. or 90° C. with 90 percent relative humidity). At 150° C., log(G') is greater than 4.4 Pa. In some embodiments, log (G') is less than or equal to 5.6 Pa or less than or equal to 5.5 Pa at 150° C. That is, 4.4 Pa<log(G')≦5.6 Pa or 4.4 Pa<log(G')≦5.5 Pa at 150° C. A log(G') of about 5.5 Pa corresponds to the Dahlquist Criteria, a measure used indicate whether a materials is a pressure sensitive adhesive.

The plateau region in the plot of log(G') versus temperature in the range of 25° C. to about 150° C. or about 125° C. is attributed to the entanglement, the molecular weight, and the crosslinking of the B block polymer chains as well as to phase transition of the A block polymer chains. The plateau region indicates that the material does not soften significantly when heated to temperatures up to about 125° C. or up to about 150° C. Such materials typically retain cohesive strength upon heating and tend to resist bubble formation when adhered to an outgassing substrate. In contrast, materials that soften significantly and flow upon heating to about 125° C. or about 150° C. are more likely to bubble when adjacent to an outgassing substrate (e.g., such materials tend to have a storage modulus change greater than 20 percent from 25° C. to 125° C. or from 25° C. to 150° C.). Therefore, suitable block copolymers are not melt processible in the temperature range of 25° C. to about 150° C. or in the range of 25° C. to about 125° C. The block copolymers can be melt processed at temperatures higher than about 150° C.

When the pressure sensitive adhesive layer is adjacent (e.g., attached or adhered) to an outgassing substrate, the pressure sensitive adhesive layer often remains visually free of bubbles. In some examples, the pressure sensitive adhesive layer is visually free of bubbles and free of bubbles that can be detected using optical microscopic techniques. In other examples, the pressure sensitive adhesive layer is visually free of bubbles but contains bubbles that can be detected using optical microscopic techniques. The pressure sensitive adhesive layers can retain cohesive strength when subjected to an aging test at elevated temperatures (e.g., 80° C. or 90° C.) with elevated humidity conditions (e.g., 90 percent relative humidity).

Any of the articles described above can include other layers such as primer layers, reinforcement layers, protective layers, and the like.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Aldrich Chemical Company; Milwaukee, Wis. unless otherwise noted.

Test Methods

Accelerated Aging Test

Several different protocols have been used for testing the aging properties of coated laminate structures. One protocol was carried out by placing the laminate in a 90° C. oven for 1 week and is called the "90° C. test". Another was carried out by placing the laminate in an oven with controlled humidity at 80° C., 90% relative humidity for 1 week and is called the "80° C./90% RH test". The result of these testing protocols is determined by visual observation. The data are reported as either "Pass" if the sample retains its optical clarity, "Marginal" if bubbles are present but not visible to the naked eye or "Bubble (s)" if bubble (s) are visible to the naked eye in the adhesive bond line.

Dynamic Mechanical Analysis

Acrylic block copolymers were tested by Dynamic Mechanical Analysis (DMA) in a parallel plate rheometer (RDA II, Rheometrics, Inc; Piscataway, N.J.) while the sample was heated from room temperature to 200° C. at a rate of 2° C./minute, a frequency of 1 radian/second, and a maximum strain of 10%. The log G' values at 25° C. and 150° C. (in Pascals) were recorded.

Table of Abbreviations

| Abbreviation or Trade Designation | Description |
|---|---|
| PMMA | Polymethylmethacrylate substrate 0.64 centimeter thick (0.25 inch), commercially available as "OPTIX" from Plaskolite, Inc; Columbus, OH |
| PC | Polycarbonate substrate 0.64 centimeter thick (0.25 inch) commercially available as "LEXAN" from General Electric, Inc; Schenectady, NY |
| SRF Film | Multilayer IR reflecting film described in U.S. Pat. No. 6,049,419 (Wheatley et al.) entitled "Multilayer Infrared Reflecting Optical Body"; |

-continued

Table of Abbreviations

| Abbreviation or Trade Designation | Description |
|---|---|
| | the film reflects light in the infrared wavelength region between about 900-1300 nm while allowing light transmission in the visible between 380-770 nm; the film has alternating layers of polyethylene terephthalate (A layer) and a copolymer of poly(methyl methacrylate); the layers are arranged in 96 optical repeat units where each optical repeat unit has 6 layers for a total of 576 layers in the film; the relative thickness of the 6 layers in each optical repeat unit is 7A:1B:1A:7B:1A:1B |
| Release Liner | T-10 Release liner, silicone coated, commercially available from CP Film; Martinsville, VA |
| BA | Butyl acrylate |
| MMA | Methyl methacrylate |
| IOA | Iso-octyl acrylate |
| THF | Tetrahydrofuran |
| MBA | 2-methylbutyl acrylate |

SYNTHESIS EXAMPLES

The (meth)acrylate block copolymer pressure sensitive adhesives (PSAs) included in the articles of this invention were made using the living, controlled polymerization technique, atom transfer polymerization (ATRP). The following shorthand is used to describe the polymers formed. For example an ABA triblock copolymer of polymethylmethacrylate and polybutylacrylate with A blocks of about 10,000 theoretical molecular weight and B block of about 60,000 theoretical molecular weight will be written as: pMMA-b-pBA-b-pMMA 10K-60K-10K. Theoretical molecular weights were varied by controlling the amounts of monomer relative to initiator. Actual molecular weights are determined by gel permeation chromatography in tetrahydrofuran solutions using polystyrene standards. Typically, the weight average molecular weight $M_w$ is used to compare the actual molecular weight against the theoretical value.

Synthesis Example 1 pMMA-b-pBA-b-pMMA 10K-60K-10K

Step 1: Preparation of a 60K pBA Midblock Macroinitiator:
A mixture of CuBr (0.00478 grams), 1,4-dibromoadipate (0.06 grams), BA (10.0 grams), anisole (0.5 grams), hexadecane (0.5 milliliters), and tris[2-(dimethylamino)ethyl]amine (9.0 microliters) was placed in a glass reaction vessel. The mixture was covered with a nitrogen atmosphere, agitated with a magnetic stirring rod, and heated to 60° C. for 20 hours. The % monomer conversion (i.e., the amount of BA remaining) was measured by Gas Chromatography and found to be about 100%. Gel Permeation Chromatography (GPC) analysis confirmed the molecular weight of about 60,000 Daltons.

Step 2: End Capping of Midblock with 10K pMMA Hardblock:
Under a nitrogen atmosphere, the midblock macroinitiator prepared in Step 1 was dissolved in about 10 mL of n-butylacetate to make a homogeneous solution. A solution containing catalyst (0.0396 grams of CuCl complexed by 108.8 microliters of 1,1,4,7,10,10-hexamethyltriethylenetetramine), 2 mL of methylethylketone, and 4 mL methylmethacrylate was added. The resulting mixture was heated under constant agitation and inert atmosphere at 90° C. for 24 hours. GPC was used to verify the calculated molecular weights. The resulting polymer was diluted further with THF to about 20% solids and filtered through alumina to remove most of the residual catalyst. The resulting PSA solution was used to make coatings. A sample of this solution was coated onto a release liner and dried in a 70° C. oven for 10 minutes and tested according to the dynamic mechanical analysis test method listed above. The results are shown in Table 1.

Synthesis Example 2 pMMA-b-pBA-b-pMMA 20K-120K-20K

Step 1: Preparation of a 120K pBA Midblock Macroinitiator:
The same procedure used for Step 1 of Synthesis Example 1 was followed except that the molecular weight of the macroinitiator was 120,000 instead of 60,000.

Step 2: End Capping of Midblock with 20K pMMA Endblock:
The same procedure used for Step 2 of Synthesis Example 1 was followed except that the molecular weight of the endblocks was 20,000 instead of 10,000. A sample of this solution was coated onto a release liner and dried in a 70° C. oven for 10 minutes and tested according to the dynamic mechanical analysis test method listed above. The results are shown in Table 1.

Synthesis Example 3 pMMA-b-pIOA-b-pMMA 14K-120K-14K

Step 1: Preparation of a 120K pIOA Midblock Macroinitiator:
The same procedure used for Step 1 of Synthesis Example 1 was followed except that the monomer IOA was used instead of BA and the molecular weight of the macroinitiator was 120,000 instead of 60,000.

Step 2: End Capping of Midblock with 14K pMMA Endblock:
The same procedure used for Step 2 of Synthesis Example 1 was followed except that the molecular weight of the endblocks was 14,000 instead of 10,000. A sample of this solution was coated onto a release liner and dried in a 70° C. oven for 10 minutes and tested according to the dynamic mechanical analysis test method listed above. The results are shown in Table 1.

Synthesis Example 4 pMMA-b-pBA-b-pMMA 14K-120K-14K

Step 1: Preparation of a 120K pBA Midblock Macroinitiator:
The same procedure used for Step 1 of Synthesis Example 1 was followed except that the molecular weight of the macroinitiator was 120,000 instead of 60,000.

Step 2: End Capping of Midblock with 14K pMMA Endblock:
The same procedure used for Step 2 of Synthesis Example 1 was followed except that the molecular weight of the endblocks was 14,000 instead of 10,000. A sample of this solution was coated onto a release liner and dried in a 70° C. oven for 10 minutes and tested according to the dynamic mechanical analysis test method listed above. The results are shown in Table 1.

Synthesis Example 5 pMMA-b-pBA-b-pMMA 12K-60K-12K

Step 1: Preparation of a 60K pBA Midblock Macroinitiator:
The same procedure used for Step 1 of Synthesis Example 1 was followed.

Step 2: End Capping of Midblock with 12K pMMA Endblock:
The same procedure used for Step 2 of Synthesis Example 1 was followed except that the molecular weight of the endblocks was 12,000 instead of 10,000.

Synthesis Example 6 pMMA-b-pBA-b-pMMA 14K-60K-14K

Step 1: Preparation of a 60K pBA Midblock Macroinitiator:
The same procedure used for Step 1 of Synthesis Example 1 was followed.

Step 2: End Capping of Midblock with 14K pMMA Endblock:
The same procedure used for Step 2 of Synthesis Example 1 was followed except that the molecular weight of the endblocks was 14,000 instead of 10,000.

Synthesis Example 7 pMMA-b-p(BA/MA)-b-pMMA 10K-60K-10K

Step 1: Preparation of a 60K p(BA/MA) Midblock Macroinitiator:
The same procedure used for Step 1 of Synthesis Example 1 was followed except that a mixture of monomers of BA and MA (in a weight ratio of 90 BA:10 MA) was used instead of BA.

Step 2: End Capping of Midblock with 12K pMMA Endblock:
The same procedure used for Step 2 of Synthesis Example 1 was followed.

Synthesis Example 8 pMMA-b-p(BA/MA)-b-pMMA 20K-120K-20K

Step 1: Preparation of a 120K p(BA/MA) Midblock Macroinitiator:
The same procedure used for Step 1 of Synthesis Example 1 was followed except that a mixture of monomers of BA and MA (in a weight ratio of 80 BA:20 MA) was used instead of BA and the molecular weight was 120,000 instead of 60,000.

Step 2: End Capping of Midblock with 20K pMMA Endblock:
The same procedure used for Step 2 of Synthesis Example 1 was followed except that the molecular weight of the endblocks was 20,000 instead of 10,000.

Synthesis Example 9 pMMA-b-pMBA-b-pMMA 10K-60K-10K

Step 1: Preparation of a 60K pMBA Midblock Macroinitiator:
The same procedure used for Step 1 of Synthesis Example 1 was followed except that the monomer MBA was used instead of BA.

Step 2: End Capping of Midblock with 10K pMMA Endblock:
The same procedure used for Step 2 of Synthesis Example 1 was followed.

Synthesis Example 10

Tri-Arm Star Block (pBA-b-pMMA)$_3$ (30K-10K)$_3$

Step 1: Synthesis of Tri-Functional ATRP Initiator 1,1,1-tris[4-(2-bromopropionyloxy)phenyl]ethane:
To a glass reaction containing a stir bar was placed 4-dimethylaminopyridine (0.8 grams), 1,1,1-tris(4-hydroxyphenyl)ethane (4.0 grams), THF (50 mL), and dry triethylamine (6.6 mL). The stirred solution was cooled to 0° C. in an ice bath, and 2-bromopropionyl bromide (5.1 mL) was added dropwise. A large amount of white precipitate formed quickly. The mixture was stirred at 0° C. for 10 minutes, warmed to room temperature and stirred for an additional 3 hours. The mixture was diluted with ethyl acetate and filtered to remove the white precipitate. The filtrate was washed with aqueous HCl (0.1 N), aqueous saturated Na$_2$CO$_3$, and aqueous saturated NaCl. The organic layer was dried over MgSO$_4$, filtered and concentrated under reduced pressure to give a yellowish solid. Methanol was added and the yellow solution was filtered to yield a white solid.

Step 2: Preparation of a Tri-Arm Star 30K pBA Midblock Macroinitiator:
The same procedure used for Step 1 of Synthesis Example 1 was followed except that the trifunctional 1,1,1-tris[4-(2-bromopropionyloxy)phenyl]ethane initiator prepared in Step 1 was used instead of the difunctional initiator 1,4-dibromoadipate.

Step 3: End Capping of the Tri-Arm Star with 10K pMMA Endblocks:
The same procedure used for Step 2 of Synthesis Example 1 was followed.

Example 1

Step 1: Preparation of PSA Coated Films

The PSA solution prepared in Synthesis Example 1 was coated onto samples of SRF Film and placed in a 70° C. oven for 10 minutes to dry to give a PSA coating thickness of 25 micrometers (1 mil). A sample of this coated and dried block copolymer PSA was tested according to the dynamic mechanical testing method listed above. The results are shown in Table 1. The PSA coatings were laminated with a release liner to keep the sample clean from dust and contamination during storage.

Step 2: Preparation of Laminates

The release liners of the PSA coated films prepared in Step 1 were removed and the PSA coated films were hot laminated to either PC (Example 1A) or PMMA (Example 1B). The samples were allowed to dwell overnight in a Constant Temperature Humidity (CTH) room (22° C./50% RH) for conditioning before exposure to aging tests. The 90° C. and 80° C./90% RH Aging Test were then carried out as described in the Test Methods above. The results are shown in Table 1.

Example 2

Step 1: Preparation of PSA Coated Films

The PSA solution prepared in Synthesis Example 2 was coated onto samples of SRF Film and placed in a 70° C. over for 10 minutes to dry to give a PSA coating thickness of 25 micrometers (1 mil). The PSA coatings were laminated with a release liner to keep the sample clean.

Step 2: Preparation of Laminates

The release liners of the PSA coated films prepared in Step 1 were removed and the PSA coated films were hot laminated to either PC (Example 2A) or PMMA (Example 2B). The samples were allowed to dwell overnight in a Constant Temperature Humidity (CTH) room (22° C./50% RH) for conditioning before exposure to aging tests. The 90° C. and 80° C./90% RH Aging Test were then carried out as described in the Test Methods above. The results are shown in Table 1.

Comparative Example C1

Step 1: Preparation of PSA Coated Films

The PSA solution prepared in Synthesis Example 3 was coated onto samples of SRF Film and placed in a 70° C. over for 10 minutes to dry to give a PSA coating thickness of 25 micrometers (1 mil). The PSA coatings were laminated with a release liner to keep the sample clean.

Step 2: Preparation of Laminates

The release liners of the PSA coated films prepared in Step 1 were removed and the PSA coated films were hot laminated to either PC (Comparative Example C1A) or PMMA (Comparative Example C1B). The samples were allowed to dwell overnight in a Constant Temperature Humidity (CTH) room (22° C./50% RH) for conditioning before exposure to aging tests. The 90° C. and 80° C./90% RH Aging Test were then carried out as described in the Test Methods above. The results are shown in Table 1.

Comparative Example C2

Step 1: Preparation of PSA Coated Films

The PSA solution prepared in Synthesis Example 4 was coated onto samples of SRF Film and placed in a 70° C. over for 10 minutes to dry to give a PSA coating thickness of 25 micrometers (1 mil). The PSA coatings were laminated with a release liner. Step 2: Preparation of Laminates The release liners of the PSA coated films prepared in Step 1 were removed and the PSA coated films were hot laminated to either PC (Comparative Example C2A) or PMMA (Comparative Example C2B). The samples were allowed to dwell overnight in a Constant Temperature Humidity (CTH) room (22° C./50% RH) for conditioning before exposure to aging tests. The 90° C. and 80° C./90% RH Aging Test were then carried out as described in the Test Methods above. The results are shown in Table 1.

Example 3

Step 1: Preparation of PSA Coated Films

The PSA solution prepared in Synthesis Example 5 was coated onto samples of SRF Film and placed in a 70° C. over for 10 minutes to dry to give a PSA coating thickness of 25 micrometers (1 mil). The PSA coatings were laminated with a release liner.

Step 2: Preparation of Laminates

The Release Liners of the PSA coated films prepared in Step 1 were removed and the PSA coated films were hot laminated to either PC (Example 3A) or PMMA (Example 3B). The samples were allowed to dwell overnight in a Constant Temperature Humidity (CTH) room (22° C./50% RH) for conditioning before exposure to aging tests. The 90° C. and 80° C./90% RH Aging Test were then carried out as described in the Test Methods above. The results are shown in Table 1.

Example 4

Step 1: Preparation of PSA Coated Films

The PSA solution prepared in Synthesis Example 6 was coated onto samples of SRF Film and placed in a 70° C. over for 10 minutes to dry to give a PSA coating thickness of 25 micrometers (1 mil). The PSA coatings were laminated with a release liner.

Step 2: Preparation of Laminates

The release liners of the PSA coated films prepared in Step 1 were removed and the PSA coated films were hot laminated to either PC (Example 4A) or PMMA (Example 4B). The samples were allowed to dwell overnight in a Constant Temperature Humidity (CTH) room (22° C./50% RH) for conditioning before exposure to aging tests. The 90° C. and 80° C./90% RH Aging Test were then carried out as described in the Test Methods above. The results are shown in Table 1.

Example 5

Step 1: Preparation of PSA Coated Films

The PSA solution prepared in Synthesis Example 7 was coated onto samples of SRF Film and placed in a 70° C. over for 10 minutes to dry to give a PSA coating thickness of 25 micrometers (1 mil). The PSA coatings were laminated with a release liner.

Step 2: Preparation of Laminates

The release liners of the PSA coated films prepared in Step 1 were removed and the PSA coated films were hot laminated to either PC (Example 5A) or PMMA (Example 5B). The samples were allowed to dwell overnight in a Constant Temperature Humidity (CTH) room (22° C./50% RH) for conditioning before exposure to aging tests. The 90° C. and 80° C./90% RH Aging Test were then carried out as described in the Test Methods above. The results are shown in Table 1.

Example 6

Step 1: Preparation of PSA Coated Films

The PSA solution prepared in Synthesis Example 8 was coated onto samples of SRF Film and placed in a 70° C. over for 10 minutes to dry to give a PSA coating thickness of 25 micrometers (1 mil). The PSA coatings were laminated with a release liner.

Step 2: Preparation of Laminates

The release liners of the PSA coated film prepared films prepared in Step 1 were removed and the PSA coated films were hot laminated to either PC (Example 6A) or PMMA (Example 6B). The samples were allowed to dwell overnight in a Constant Temperature Humidity (CTH) room (22° C./50% RH) for conditioning before exposure to aging tests. The 90° C. and 80° C./90% RH Aging Test were then carried out as described in the Test Methods above. The results are shown in Table 1.

Example 7

Step 1: Preparation of PSA Coated Films

The PSA solution prepared in Synthesis Example 9 was coated onto samples of SRF Film and placed in a 70° C. over for 10 minutes to dry to give a PSA coating thickness of 25 micrometers (1 mil). The PSA coatings were laminated with a release liner.

Step 2: Preparation of Laminates

The release liners of the PSA coated film prepared films prepared in Step 1 were removed and the PSA coated films were hot laminated to either PC (Example 7A) or PMMA (Example 7B). The samples were allowed to dwell overnight in a Constant Temperature Humidity (CTH) room (22° C./50% RH) for conditioning before exposure to aging tests. The 90° C. and 80° C./90% RH Aging Test were then carried out as described in the Test Methods above. The results are shown in Table 1.

Example 8

Step 1: Preparation of PSA Coated Films

The PSA solution prepared in Synthesis Example 10 was coated onto samples of SRF Film and placed in a 70° C. over for 10 minutes to dry to give a PSA coating thickness of 25 micrometers (1 mil). The PSA coatings were laminated with a release liner.

Step 2: Preparation of Laminates

The release liners of the PSA coated film prepared films prepared in Step 1 were removed and the PSA coated films were hot laminated to either PC (Example 8A) or PMMA (Example 8B). The samples were allowed to dwell overnight in a Constant Temperature Humidity (CTH) room (22° C./50% RH) for conditioning before exposure to aging tests. The 90° C. and 80° C./90% RH Aging Test were then carried out as described in the Test Methods above. The results are shown in Table 1.

TABLE 1

| Example | PSA Solution Synthesis Example Number | Substrate | 90° C. Aging Test Results | 80° C./90% RH Aging Test Results | Log(G') at 25° C. (Pascals) | Log(G') at 150° C. (Pascals) |
| --- | --- | --- | --- | --- | --- | --- |
| 1A | 1 | PC | Pass | Marginal | 5.34 | 4.84 |
| 1B | 1 | PMMA | Pass | Pass | | |
| 2A | 2 | PC | Marginal | Marginal | 5.34 | 4.86 |
| 2B | 2 | PMMA | Pass | Marginal | | |
| C1A | 3 | PC | Bubbles | Bubbles | 4.63 | 4.22 |
| C1B | 3 | PMMA | Bubbles | Bubbles | | |
| C2A | 4 | PC | Bubbles | Bubbles | 5.13 | 4.46 |
| C2B | 4 | PMMA | Bubbles | Bubbles | | |
| 3A | 5 | PC | Pass | Pass | NM | NM |
| 3B | 5 | PMMA | Pass | Pass | | |
| 4A | 6 | PC | Pass | Pass | NM | NM |
| 4B | 6 | PMMA | Pass | Pass | | |
| 5A | 7 | PC | Marginal | Bubbles | NM | NM |
| 5B | 7 | PMMA | Pass | Pass | | |
| 6A | 8 | PC | Marginal | Bubbles | NM | NM |
| 6B | 8 | PMMA | Pass | Pass | | |
| 7A | 9 | PC | Bubbles | Bubbles | 5.30 | 4.78 |
| 7B | 9 | PMMA | Pass | Pass | | |
| 8A | 10 | PC | Bubbles | Pass | 5.60 | 4.83 |
| 8B | 10 | PMMA | Pass | Pass | | |

NM = Not measured

We claim:

1. An article comprising:
   a) an optical film having a first major outer surface and a second major outer surface opposite the first major outer surface;
   b) a substrate; and
   c) an optically clear pressure sensitive adhesive layer positioned between said first major outer surface of the optical film and the substrate, said pressure sensitive adhesive layer being free of birefringence and comprising a (meth)acrylate block copolymer comprising
      i. at least two A block polymeric units that are the reaction product of a first monomer composition comprising an alkyl methacrylate, an aralkyl methacrylate, an aryl methacrylate, or a combination thereof, each A block having a Tg of at least 50° C., said (meth)acrylate block copolymer comprising 20 to 50 weight percent A block; and
      ii. at least one B block polymeric unit that is the reaction product of a second monomer composition comprising an alkyl (meth)acrylate, a heteroalkyl (meth)acrylate, a vinyl ester, or a combination thereof, said B block having a Tg no greater than 20° C., said (meth)acrylate block copolymer comprising 50 to 80 weight percent B block,
   wherein the A block polymeric units are present as nanodomains having an average size less than about 150 nanometers in a matrix of the B block polymeric units.

2. The article of claim 1, wherein the A block polymeric units have a Tg of at least 100° C. and the B block polymeric unit has a Tg no greater than 0° C.

3. The article of claim 1, wherein the A block comprises poly(methyl methacrylate).

4. The article of claim 3, wherein the second monomer composition comprises an alkyl (meth)acrylate with the alkyl group having 4 to 18 carbon atoms.

5. The article of claim 1, wherein the A block has a weight average molecular weight of at least 5,000 g/mole and the B block has a weight average molecular weight of at least 30,000 g/mole.

6. The article of claim 1, wherein the (meth)acrylate block copolymer is a triblock copolymer or a starblock copolymer with the A blocks being endblocks.

7. The article of claim 1, wherein the substrate comprises an outgassing layer selected from a polycarbonate or poly(meth)acrylate.

8. The article of claim 1, wherein the substrate is a release liner.

9. The article of claim 1, wherein the optical film has multiple layers.

10. The article of claim 1, wherein the substrate is an outer surface of an electronic display, an outer surface of a window or glazing, or an outer surface of an optical component.

11. The article of claim 1, wherein the substrate is an outer surface of an electronic display and the optical film has multiple layers.

12. The article of claim 1, wherein the optically clear pressure sensitive adhesive layer further comprises a plasticizer, tackifier, or combination thereof.

13. An article comprising:
   a) an optical film having a first major outer surface and a second major outer surface opposite the first major outer surface; and
   b) a first optically clear pressure sensitive adhesive adjacent to the first major outer surface of said optical film, said first optically clear pressure sensitive adhesive being free of birefringence and comprising a (meth)acrylate block copolymer comprising
      i. at least two A block polymeric units that are the reaction product of a first monomer composition comprising an alkyl methacrylate, an aralkyl methacrylate, an aryl methacrylate, or a combination thereof, each A block having a Tg of at least 50° C., said (meth)acrylate block copolymer comprising 20 to 50 weight percent A block; and
      ii. at least one B block polymeric unit that is the reaction product of a second monomer composition comprising an alkyl (meth)acrylate, a heteroalkyl (meth)acrylate, a vinyl ester, or a combination thereof, said B block having a Tg no greater than 20° C., said (meth)acrylate block copolymer comprising 50 to 80 weight percent B block; and
   c) a second adhesive adjacent to the second major outer surface of the optical film,
   wherein the A block polymeric units are present as nanodomains having an average size less than about 150 nanometers in a matrix of the B block polymeric units.

14. The article of claim 13, wherein the second adhesive is an optically clear pressure sensitive adhesive.

15. The article of claim 13, further comprising a substrate attached to an outer surface of at least one of the first optically clear pressure sensitive adhesive or the second adhesive.

16. The article of claim 15, wherein the substrate is a release liner.

17. The article of claim 15, wherein the substrate is an outer surface of an electronic display, an outer surface of a window or glazing, or an outer surface of an optical component.

18. The article of claim 15, wherein the substrate is an outer surface of an electronic display and the optical film has multiple layers.

19. The article of claim 13, wherein the optical film has multiple layers.

20. The article of claim 13, wherein the optical film is a brightness enhancement film, specular reflector film, light control film, polarizer, or mirror film.

21. The article of claim 13, wherein the second adhesive comprises the (meth)acrylate block copolymer.

* * * * *

UNITED STATES PATENT AND TRADEMARK OFFICE
CERTIFICATE OF CORRECTION

PATENT NO. : 7,494,708 B2 Page 1 of 1
APPLICATION NO. : 11/872979
DATED : February 24, 2009
INVENTOR(S) : Albert I. Everaerts It is certified that error appears in the above-identified patent and that said Letters Patent is hereby corrected as shown below:

Column 4

Line 16; Delete "Tg'" and insert -- Tg --, therefor.

Column 8

Line 6; Delete "polydisperistiy" and insert -- polydispersity --, therefor.

Line 58; Delete "inferter" and insert -- iniferter --, therefor.

Column 24

Line 14; After "liner." delete "Step 2: Preparation of Laminates" and insert the same on Column 24, Line 15 as a heading.

Signed and Sealed this

Fourth Day of May, 2010

David J. Kappos
*Director of the United States Patent and Trademark Office*